United States Patent [19]
Wood et al.

[11] 3,934,077
[45] Jan. 20, 1976

[54] VIEWING SYSTEM

[75] Inventors: Kenneth E. Wood; James T. O'Farrell, both of Annapolis; William F. Parrish, Baltimore; Gordon M. Roesler, Annapolis, all of Md.

[73] Assignee: Westinghouse Electric Corporation, Pittsburgh, Pa.

[22] Filed: June 24, 1974

[21] Appl. No.: 482,189

[52] U.S. Cl. ............... 178/6; 178/6.6 DD; 178/6.8; 178/DIG. 1; 178/DIG. 38
[51] Int. Cl.² ..................... H04N 1/38; H04N 3/24
[58] Field of Search...... 178/6, 6.8, 6.6 DD, DIG. 1, 178/DIG. 38

[56]  References Cited
UNITED STATES PATENTS
3,527,881   9/1970   Blanchard............................. 178/6

Primary Examiner—Benedict V. Safourek
Assistant Examiner—Edward L. Coles
Attorney, Agent, or Firm—D. Schron

[57]  ABSTRACT

An underwater floodlit scene is viewed by a TV camera. The first few active TV lines in the scan format, indicative of the illuminated field where backscatter is a minimum, are stored on a video disk. As the apparatus travels over a target area to be viewed, subsequent portions of the TV video signal from the minimum backscatter area are subsequently stored on the disk. The stored signals are then displayed on a TV monitor as a moving window display. The number of active TV lines gated for storage on the disk may be made proportional to the carrier vehicle speed, altitude and camera viewing angle, or field of view.

11 Claims, 17 Drawing Figures

VIEWING SYSTEM

BACKGROUND OF THE INVENTION

Field of the Invention:

The invention in general relates to viewing systems, and more particularly to a TV viewing system in an underwater environment or other medium subject to backscatter.

Description of the Prior Art:

For viewing targets in a backscatter medium, such as in underwater viewing, extensive use is made of television cameras. In the conventional floodlit underwater imaging system, it is well known that the contrast obtained is limited because the camera must view the scene through a veiling irradiance produced by the scattering volume formed by the intersection of the light beam and the TV camera field of view.

In performing studies such as biological and geological surveys, the viewing apparatus on a carrier vehicle moves over the target area terrain along a course line and very often backscatter problems make target identification extremely difficult, if not impossible. Backscatter can be reduced by minimizing the mutual volume between the light and the camera field of view and several techniques propose the use of mechanical scanning devices. These mechanical devices, however, are often difficult to implement and suffer from synchronizing problems.

The present invention provides a viewing system wherein the effects of backscatter are significantly reduced without the requirement of mechanical scanning of a light beam or scanning camera aperture.

SUMMARY OF THE INVENTION

The apparatus of the present invention includes a TV camera which may be mounted on a carrier vehicle for movement over the target area to be viewed. A light source illuminates the target area in the field of view of the TV camera whereby the size of the common volume of light beam and camera field of view varies over the field of view and therefore the amount of veiling irradiance varies, with the reduced backscatter being at one end of the field of view.

Circuit means are provided for gating only a portion of the video output of the camera during each TV frame, the gated portion corresponding to scene information from the area of reduced backscatter. These gated portions of video output are stored and subsequently displayed on a TV monitor in juxtaposed positions and are caused to move on the display monitor so as to appear as a real-time display.

In the preferred embodiment the gated video output, representing a predetermined number of active TV lines, is placed into a storage location in the form of a rotating magnetic video disk which rotates at a constant speed. The stored signals are read from the disk and applied to the TV monitor. The system is such that for the common two to one interlace system, the phase of the TV camera is advanced relative to the phase of the disk, during each TV frame.

DESCRIPTION OF THE PREFERRED EMBODIMENT

Figure 1:
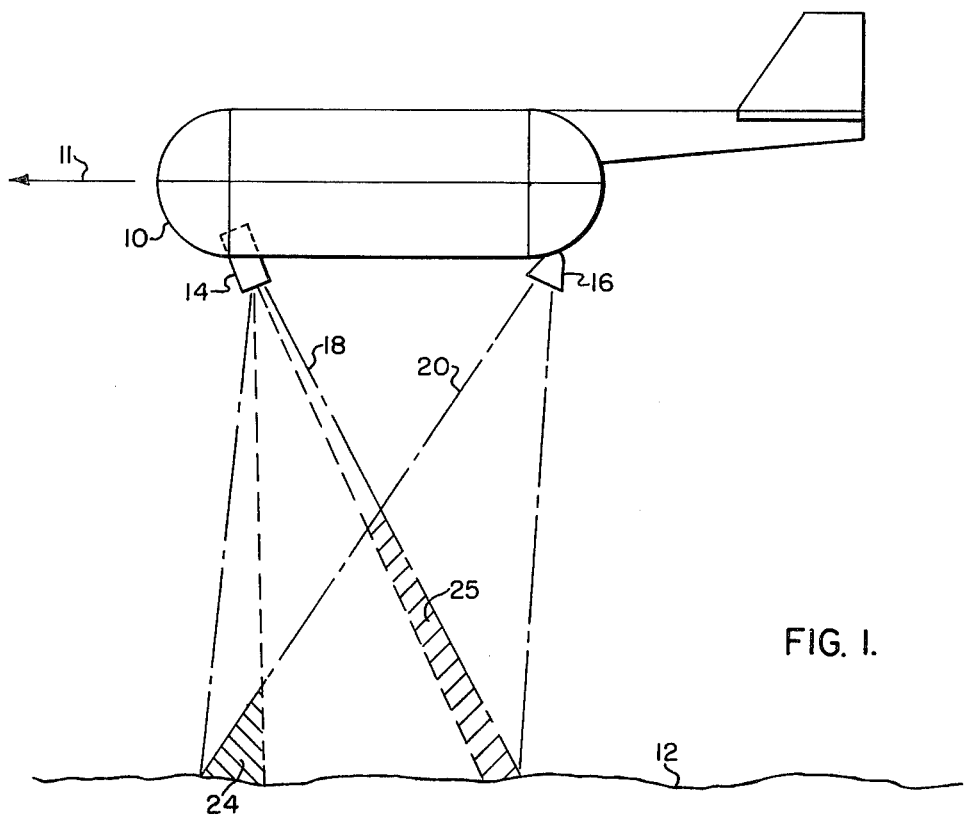
FIG. 1 illustrates the geometry of the typical floodlit underwater imaging system.

In FIG. 1, a carrier vehicle 10 moving in the direction of the arrow 11, passes over a target area 12 to be viewed. A TV camera 14 is utilized for viewing purposes, and in a medium subject to backscatter, such as the underwater environment, a source of illumination 16 is spaced as far as practical from the TV camera 14 to minimize the common volume between the field of view 18 of the TV camera 14, and the light beam 20.

Figure 2:
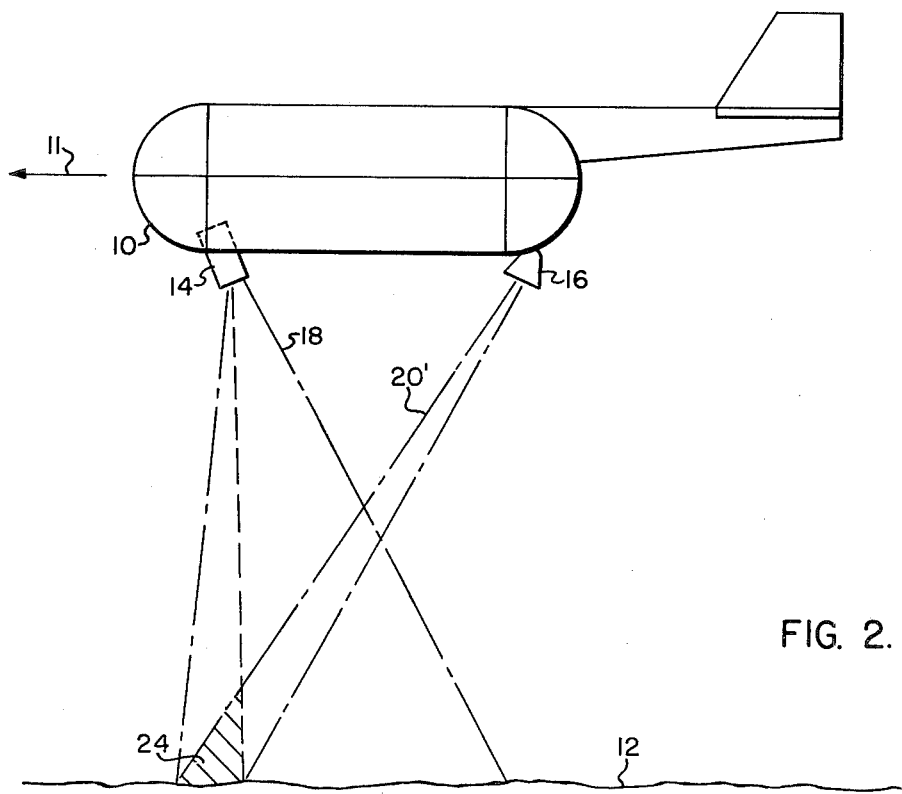
FIG. 2 is similar to FIG. 1, but illustrates a preferred lighting arrangement.

With the camera and light offset as illustrated in FIG. 1, the contrast in the general area 24 is noticeably better than in the general area 25 due to the reduced common volume of field of view 18 and light beam 20. In the present invention, only that scene information from the general area 24 is utilized in making up a composite picture. With such operation, the light beam 20 may, if desired, be concentrated to the general area 24, as illustrated in FIG. 2 where the light beam is designated by the numeral 20'.

Figure 3A:
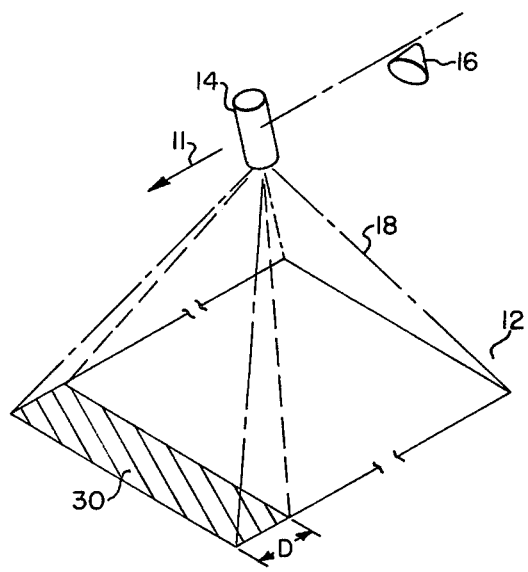
FIGS. 3A to 3C serve to illustrate the movement of a TV camera over a target area and illustrate the portion of scene information utilized during each TV camera frame.

FIG. 3A shows another view of the apparatus and illustrates a swath or segment 30 of the target area in the vicinity of the reduced backscatter area 24 of FIG. 1. The TV output is gated such that only scene information from the swath 30 is utilized.

Figure 3B:
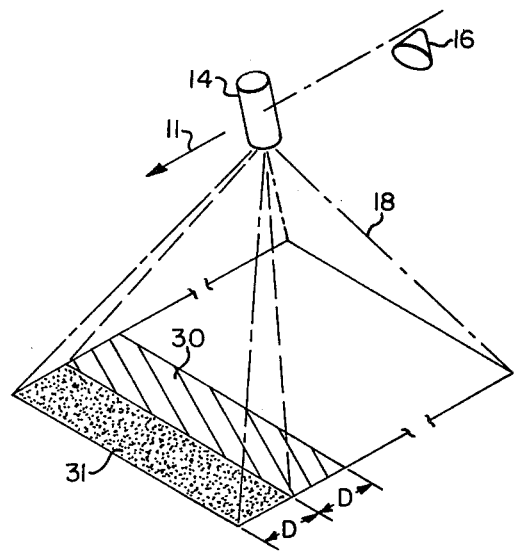
Figure 3C:
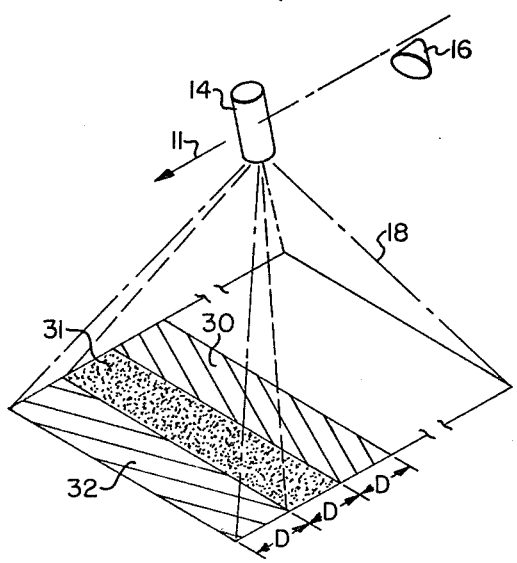

If the dimension of the swath 30 in the direction of travel 11 is of a value D, then the system operation is such that the apparatus will have travelled a distance D by the start of the next TV frame such that a next swath 31 may be examined as illustrated in FIG. 3B. After another TV frame, the apparatus will have travelled another distance D to view a next swath 32, as illustrated in FIG. 3C and the procedure is continued such that the camera output utilized is from only that portion of the field of view where backscatter is minimized.

Figure 4A:
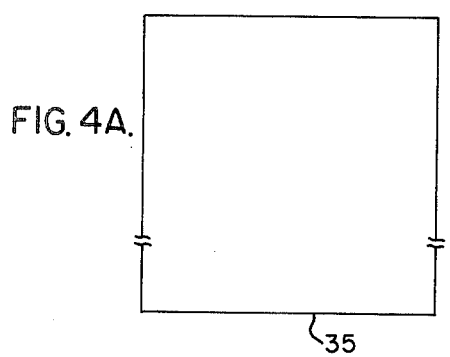
FIGS. 4A through 4D illustrate the scene displayed on the TV monitor during movement of the apparatus of FIGS. 3A to 3C.
Figure 4B:
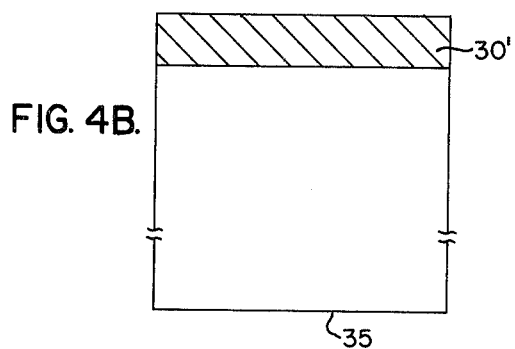
Figure 4C:
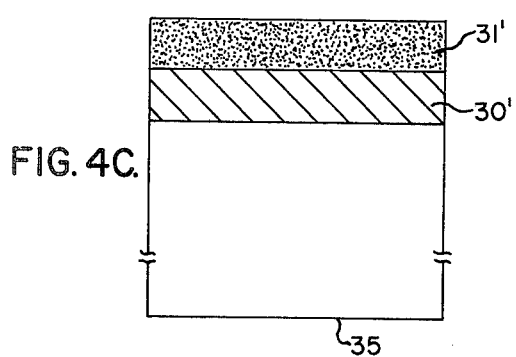
Figure 4D:
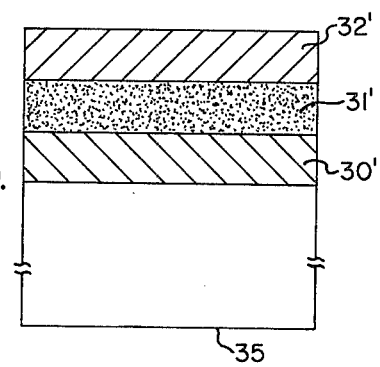

The gated video from the various swaths are assembled and displayed as a moving window display as illustrated in FIGS. 4A through 4D. In the operation of the present invention, as will be explained, the swath 30 in FIG. 3A (as well as 31 in FIG. 3B and 32 in FIG. 3C) is actually in the vertical blanking period and so the display will initially appear as in FIG. 4A on the next TV frame, as seen in FIG. 4B, section 30' on the display 35 has come into view and is indicative of the swath 30 of FIG. 3A. After the next TV frame, FIG. 4C, section 30' will have moved down the display 35 and the new section 31' will be displayed at the top of the screen, indicative of the area 31 of FIG. 3B. In FIG. 4D, sections 30' and 31' have moved down the display and section 32' is displayed at the top of the screen, indicative of the section 32 of FIG. 3C. The process is continued such that new scene information appears at the top of the screen and progresses toward the bottom of the screen as would a real-time display.

Figure 5:
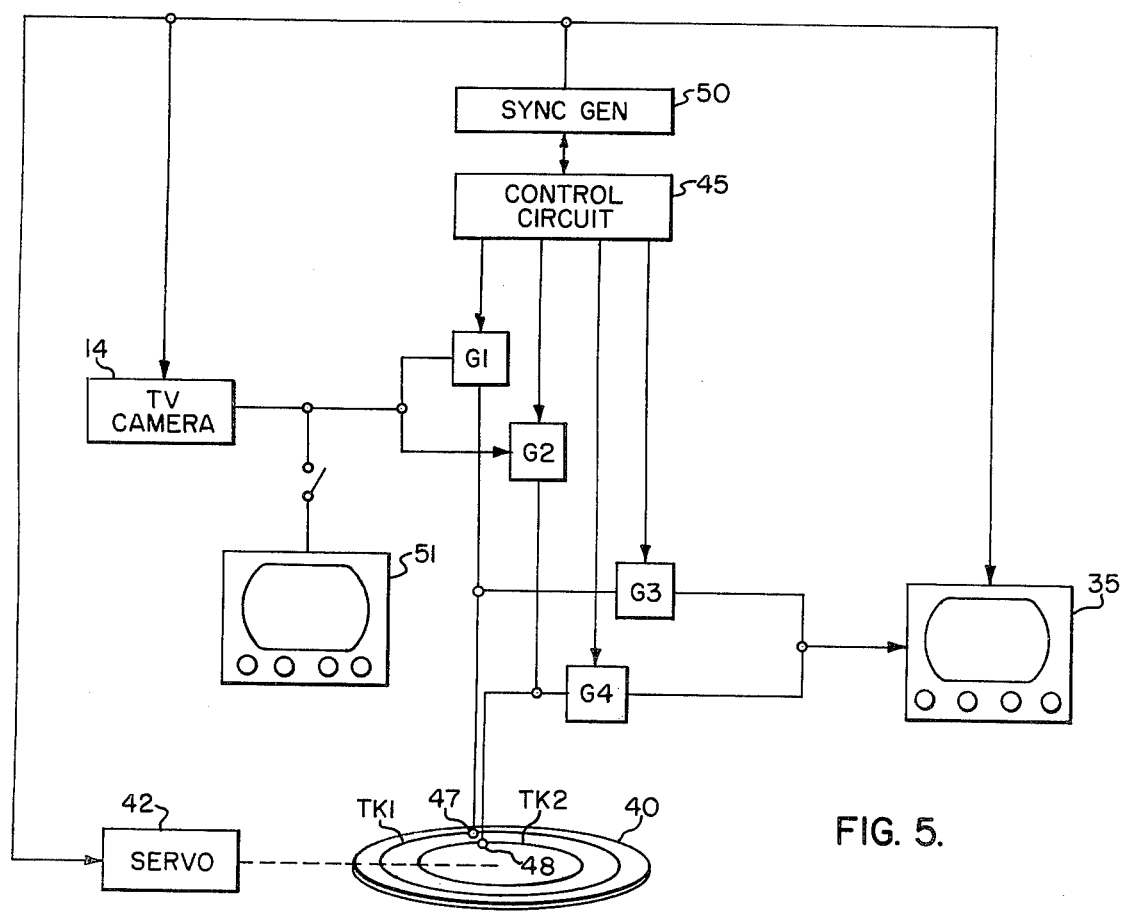
FIG. 5 illustrates in block diagram form a preferred embodiment of the present invention.

FIG. 5 illustrates in block diagram form an embodiment of the circuitry which accomplishes the reduction of the effective backscatter in the viewing system. The portion of the video output which is gated during each TV frame is placed into a storage means preferably in the form of a rotating magnetic video disk 40.

For flicker free TV presentation, most TV systems utilize a two to one interlace operation. The disk 40 under the control of a servo mechanism 42 may be operated at a rotational speed of 3600 rpm so that one complete rotation of the disk 40 is equivalent to 16.66 milliseconds, the time duration of one TV field in a 60 field per second system. The disk 40 includes a first track TK1 for recording signals of the odd field, and a second track TK2 for recording signals of the even field. The recording onto the disk 40 of TV line output signals from the TV camera 14 is governed by gates G1 and G2, alternately enabled by means of enabling signals from the control circuit 45 to gate the signal to either one of two magnetic read-write heads 47 or 48.

For reading the signals recorded on the disk 40 there is provided gates G3 and G4 which are respectively connected to heads 47 and 48, and which are alternately enabled by means of enabling signals from the control circuit 45 to pass the signals to the monitor 35 for display purposes. The magnetic video disk technology and the control of the disk 40 by the servo 42 to maintain a constant rotational speed are techniques well known to those skilled in the art.

In order to provide the necessary signals for proper TV operation, there is provided a sync generator 50 which supplies output signals to the TV camera 14, the monitor 35, servo 42 and control circuit 45. Such sync generators are very often provided with the video disk equipment and require very little modification for practice of the present invention. If desired, a conventional TV viewing arrangement may be included with the provision of TV monitor 51 which may be connected to receive the entire video output of the TV camera 14. In such instance conventional sync signals would be provided.

Figure 6:
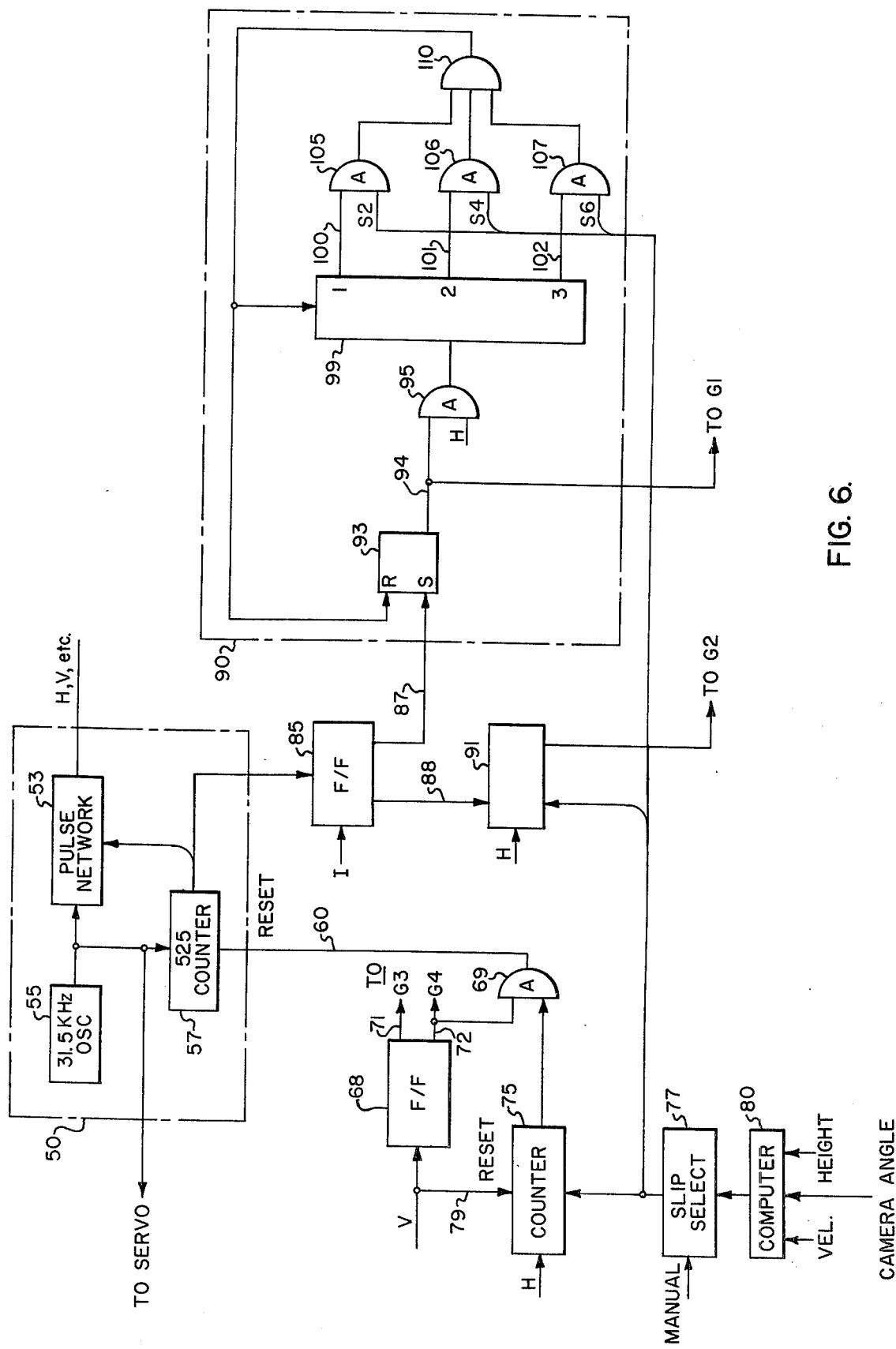
FIG. 6 illustrates in block diagram form the control circuit of FIG. 5 in somewhat more detail.

The gating, storage, and moving window display are governed by the control circuit 45 which is shown in somewhat more detail in FIG. 6, along with the sync generator 50.

The sync generator 50 illustrated in FIG. 6 provides the signals necessary for TV operation, such as the horizontal drive, vertical drive, blanking, and horizontal and vertical synchronizing signals. Basically, these signals are provided by a pulse network 53 which receives input signals from a master 31.5 kilohertz oscillator 55 and from the 525 counter 57 which is the half-line counter in a two to one, 525 line, interlace system. The half-line counter 57 is modified to accept a reset signal on line 60 so as to reset prior to its normal 525 count.

Figure 7:
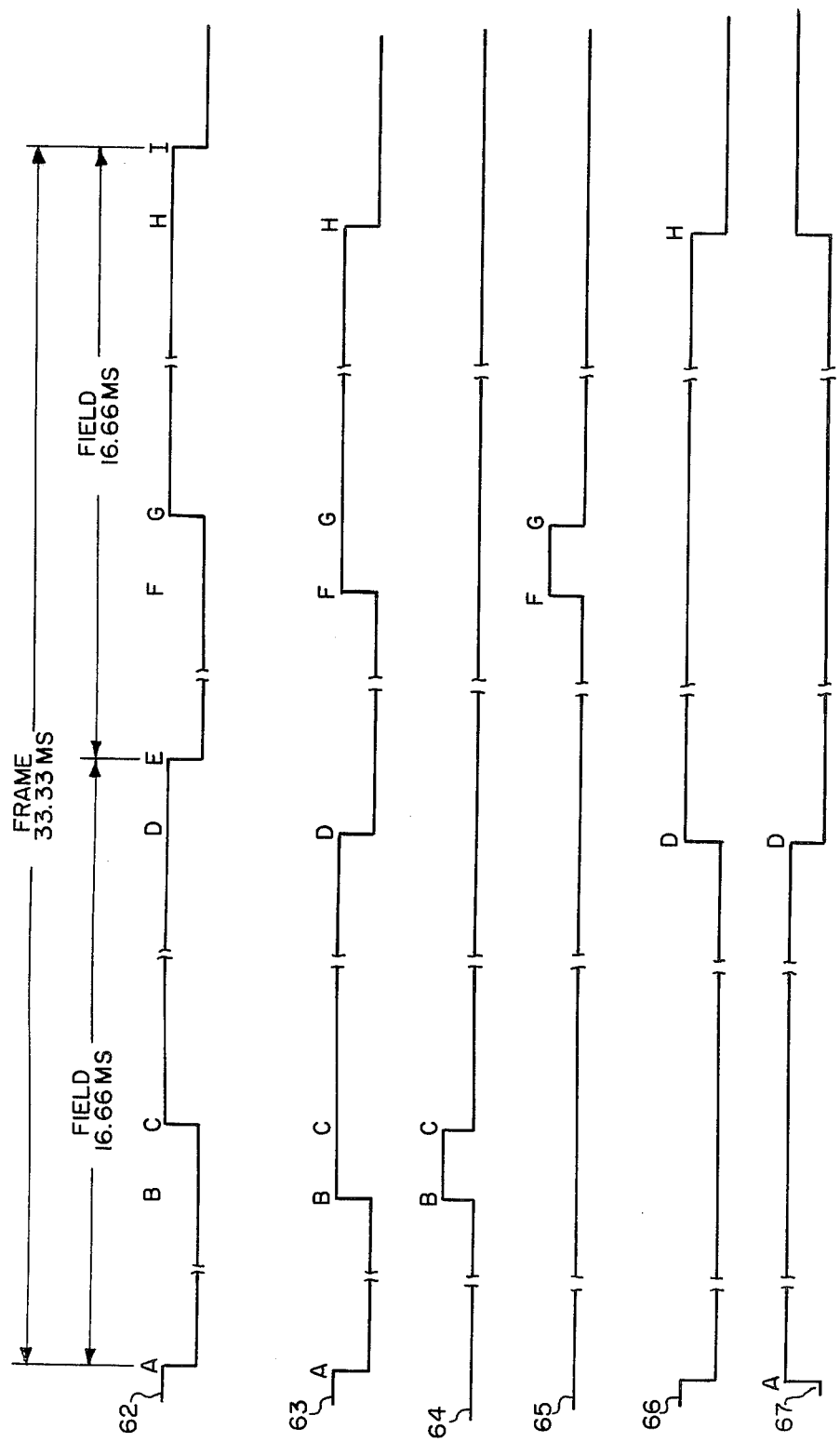
FIG. 7 illustrates waveforms to aid in the understanding of the operation of the present invention.

As will be described, this premature resetting of the half-line counter 57 causes the field to be advanced by a predetermined number of TV lines. The number of TV lines advanced will be a function of the carrier vehicle's velocity and height above the target area, for a fixed camera field of view angle. With a two to one interlace system N lines are advanced during one field of the frame, which has the effect of a 2N line advance per frame. For example, with additional reference to FIG. 7, waveform 62 represents the typical blanking and unblanking periods during a normal TV frame. A vertical drive signal at time A coincides with the beginning of vertical blanking which exists from time A to C, a typical value being 20 TV lines. The active portion during which a display may be seen exists from time C to E, the end of the first field, and would encompass 242 and ½ TV lines. Vertical blanking for the second field commences at time E and exists from time E to G for 20 TV lines after which the active portion from time G to I exists for 242 and ½ TV lines with the operation from time A to I constituting one TV frame.

Let it be assumed that the carrier vehicle speed and altitude requires a slip of 4 TV lines, that is, the net advance of the TV picture on the monitor will be 4 lines per frame. This is equivalent to the distance D in FIG. 3A. If 4 lines are advanced per frame, 120 will be advanced per second and the picture will move across the monitor display in about 4 seconds. Let it be assumed that two TV lines are encompassed by the time period from B to C and F to G of waveform 62. If the vertical blanking period is prematurely terminated by resetting of the halfline counter 57 at time B, or if the vertical blanking period is caused to begin two TV lines early, then the two TV lines previously in the vertical blanking period may now be displayed, as well as the two TV lines previously in the vertical blanking period from time F to G.

It is to be noted that although the vertical blanking period extends from A to C (waveform 62), the actual vertical retrace of the scanning electron beam in the TV camera or the TV monitor takes less time than the vertical blanking. So that prior to time B, the electron beam would normally be scanning across the screen, however, the beam is turned off in the monitor and camera until time C, by the blanking signal derived from the synchronizing generator.

The operation of the apparatus is such that the provision of the gating signal from time B to C, as illustrated by waveform 64 gates the two previously blanked TV lines into storage on track TK1 of the disk 40 and the gating signal from time F to G as illustrated by waveform 65 gates the two previously blanked TV lines into storage onto track TK2 of the disk 40. Accordingly, although the TV camera may provide a video output indicative of the entire scene in its field of view, only the first four lines of information are gated into storage to be utilized in assembling the display picture. Waveform 66 illustrates the gating signal supplied to gate G3 and waveform 67 illustrates the gating signal supplied to gate G4 for reading out the stored information from respective tracks TK1 and TK2 and presenting it to the TV monitor.

Referring once again to FIG. 6, circuitry is provided for prematurely resetting (advancing) the half-line counter 57 by a predetermined number of TV lines, on every other field. The reset signal on line 60 is provided by an AND gate 69 which is enabled on every other field by means of a flip-flop 68 which provides an enabling output signal alternately on lines 71 and 72 in response to input vertical drive signals V. These enabling output signals on lines 71 and 72 may also constitute the respective enabling signals for gates G3 and G4, as represented by waveforms 66 and 67 of FIG. 7.

Counter 75 is operable to count TV lines as indicated by the horizontal drive signal H and will provide an output signal to the AND gate 69 when a predetermined number of TV lines have been counted, as governed by the slip select circuit 77. For example, with a known vertical retrace period of 20 TV lines, for a four line per frame slip, the slip select circuit 77 will cause counter 75 to provide an output signal after 18 horizontal drive signals such that if the flip-flop 68 is providing an output signal on line 72, AND gate 69 will provide the reset signal to the half-line counter 57 to reset it. With respect to FIG. 7, the output of counter 75 occurs at the count of 18, which occurs at time B. At time D (waveform 63) the vertical blanking for the advanced second field commences and the provision of a vertical drive signal at this time causes flip-flop 68 to change its enabling output signal to line 71. AND gate 69, therefore, will not provide an output signal when counter 75 attains the count of 18, and accordingly, the half-line counter 57 will continue counting in its normal sequence. Each time that flip-flop 68 switches its output state by virtue of the input vertical drive signal V, the counter 75 will be reset by this same signal being applied to it on line 79. At the commencement of the next field at time H, flip-flop 68 will again provide an enabling signal on line 72 in response to the vertical drive signal V and the operation will be identical to that previously described starting at time A. However, the carrier vehicle will have advanced a distance corresponding to four TV lines in the field of view.

The number of lines advanced is a function of carrier vehicle velocity relative to the target area, its height above it and the camera angle or field of view. The slip select circuit 77 may be set manually to govern the number of TV lines slipped or alternatively slip select circuit 77 may be controlled by a computer 80 which automatically sets it in response to velocity and height information for a predetermined camera viewing angle.

Since only four TV lines of the entire TV camera output during each frame are to be written onto the video disk, circuit means are provided for gating two TV lines of each field, that is from time B to C for the first field and F to G for the second field. This may be accomplished in a number of ways, one of which is to sense the resetting of the half-line counter 57 and generate a gating signal for gates G1 or G2 for the desired number of TV lines, in the present example, two TV lines per field. To accomplish this, there is provided a flip-flop 85 which receives a signal each time that the half-line counter 57 is reset, and in response thereto, provides alternate outputs either on line 87 or 88 which respectively enable pulse generating circuits 90 and 91.

Circuit 90, identical to circuit 91, is shown in somewhat more detail and includes a flip-flop 93 which in response to a signal on line 87 to the S input will provide an output signal on line 94. This is equivalent to the waveform 64 going positive at time B. The enabling signal on line 94 is provided to AND gate 95 which also receives the horizontal drive input H indicative of TV lines. With the AND gate 95 thus enabled, a counter 99 is then operable to count TV lines and to provide a unique output signal on one of a plurality of output lines 100 to 102 connected to respective AND gates 105 to 107. Although only three output lines are illustrated, it is to be understood that a typical system may have many more.

The occurrence of one TV line will advance the counter to provide an output on line 100, two TV lines will cause an output on line 101 and three TV lines will cause an output on line 102. In the present example, four TV lines are slipped during each frame, and accordingly, the slip select circuit 77 provides an enabling signal S4 to only one of the AND gates, AND gate 106. If a slip of two lines per frame (one per field) is desired, the slip select circuit 77 would provide an enabling signal S2 to AND gate 105, and if a slip of 6 lines per frame (3 per field) were desired, the slip select circuit 77 would provide the enabling signal S6 to AND gate 107. Accordingly, after two TV lines, AND gate 106 will provide an output signal which passes through OR gate 110 and which applied to the R input of flip-flop 93 resets it to turn off the enabling signal to gate G1, at time C of waveform 64. The output of OR gate 110 also serve to reset the counter 99 so that the process may be repeated after the next field.

The gate pulse generating circuit 91 operates in the same manner when it is provided with an enabling signal on line 88 from flip-flop 85 such that gate G2 is provided with an enabling signal for two TV lines from time F to G of waveform 65.

To initialize the control function, each of the flip-flops may be provided with an initializing signal I to force them into a predetermined one of their two states.

Figure 8A:
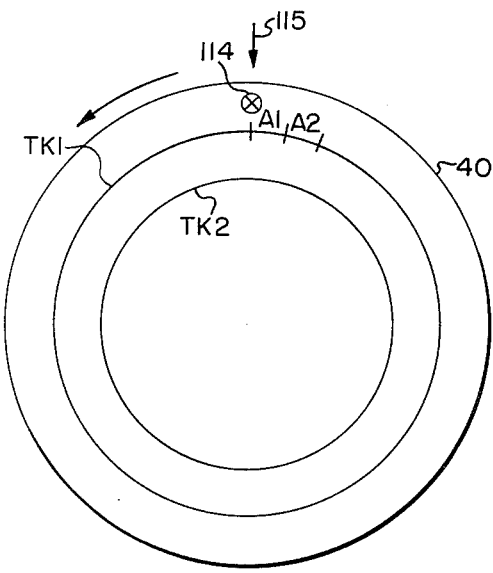
FIGS. 8A through 8D illustrate the writing of information onto the video disk illustrated in FIG. 5.
Figure 8B:
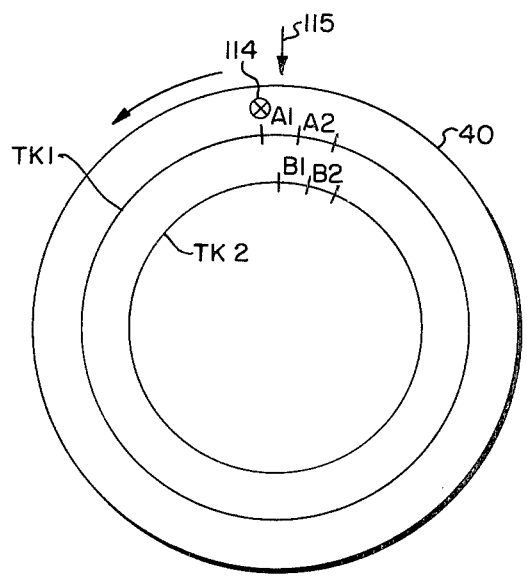

Moving window displays are known in the art, and one embodiment utilized in conjunction with a sonar system is described in U.S. Pat. No. 3,792,194. The moving window display in the present invention may be explained with reference to FIGS. 8A to 8D and FIG. 9. It will be remembered that at time B (FIG. 7) gate G1 is enabled to pass the TV video for two TV lines such that it is written on track TK1 of disk 40. In FIG. 8A with the disk 40 rotating counterclockwise, these two TV lines will be written into positions designated A1 and A2. For convenience, a reference mark 114 is shown on the disk 40 and a reference arrow 115 is shown at what can be considered as the 12 o'clock position. Although not illustrated, the writing heads are located over respective tracks TK1 and TK2 on a radius, such as at the 12 o'clock position. For a 525 line, two to one interlace system, each track TK1 and TK2 accommodates 262 and ½ TV lines. The two TV lines gated from time F to G are written on track TK2, as illustrated in FIG. 8B in the positions B1 and B2, ½ a TV line displaced from the reference mark 114.

Figure 8C:
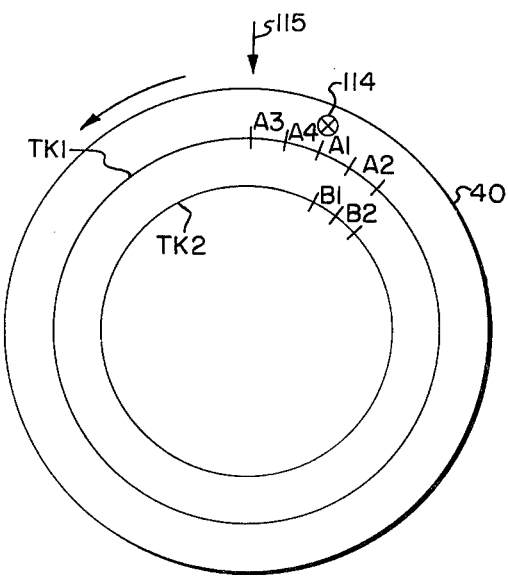
Figure 8D:
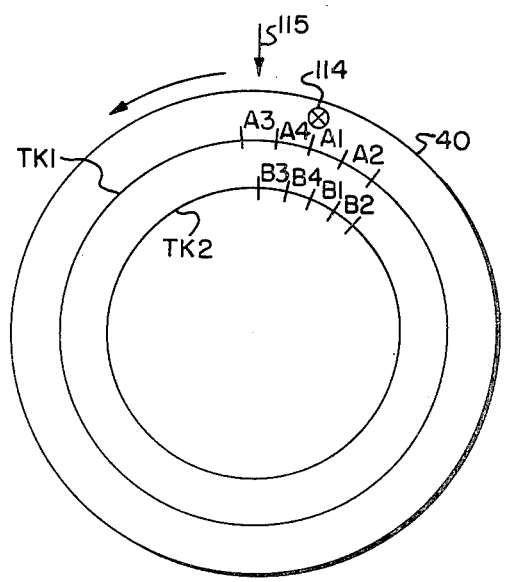

On the next field, there is an advancement of two TV lines, and since the disk is rotating at a constant field rate, the two previously blanked TV lines will be written into positions A3 and A4, ahead of A1 and A2, as illustrated in FIG. 8C. The effect of this is to also cause the previously blanked two TV lines in the even field to be written into positions B3 and B4, illustrated in FIG. 8D. Were it not for the fact that the camera phase is advanced by two TV lines, each time an enabling signal is provided to G1 or G2 information would always be written into the location A1, A2, and B1, B2.

Figure 9:
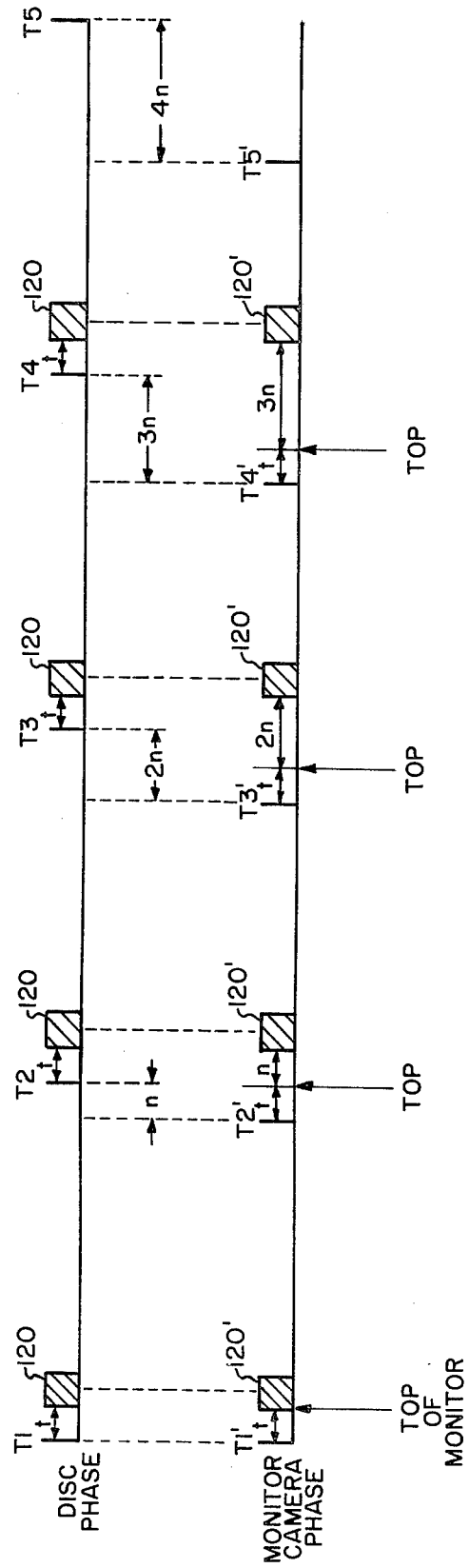
FIG. 9 illustrates a comparison of the TV monitor phase relative to the phase of the video disk.

FIG. 9 serves to illustrate the movement of information down the screen of the monitor, by comparing the disk phase to the monitor phase. The upper diagram represents the disk phase, which for a 3600 rpm disk would start a new frame at times T1, T2, T3, etc., with the disk making two revolutions per frame.

Information, represented by block 120, written on a portion of the disk appears, relative to some reference, at a time t after the occurrence of T1. Since the information is recorded on the disk, it will always appear at the same time t after the commencement of a new frame at T2, T3, etc. Let it be assumed that time T1 would normally coincide with the beginning of vertical blanking which would last for a time duration t such that the information 120 would appear at the top of the monitor screen. This is shown by the lower diagram of FIG. 9 which represents the monitor (and camera) phase. Initially, the beginning of the monitor phase at T1' coincides with the beginning of the disk frame at T1 and accordingly the information 120' which is displayed on the monitor will be displayed at the top thereof. Since the monitor phase is advanced relative to the disk phase, the next monitor frame commences at time T2' at a time $n$ before T2 where it would ordinarily occur. At a time $t + n$ past T2', the information 120 is read from the disk and displayed as information 120' displaced from the top of the monitor screen by a distance equivalent to $n$. The next monitor frame at time T3' occurs at a time $2n$ prior to the disk frame at T3. This places the displayed information 120' at a distance equivalent to $2n$ from the top of the monitor screen. The occurrence of the next monitor frame at T4', $3n$ before the disk frame at T4 has the effect of further moving down the information 120' on the display area. The process is continued until such time as the displayed information 120' goes off the bottom of the screen and the previously-stored information 120 on the disk will be erased and eventually new information will be written into its location. During this relative movement process, previously blanked TV lines are gated into juxtaposed stored locations on the disk so that the display appears as explained with respect to FIGS. 4B through D.

We claim:
1. Apparatus for viewing a target area in a medium subject to backscatter, comprising:
  A. a TV camera adapted for movement relative to said target area;
  B. means for illuminating at least a fixed portion of said target area in the field of view of said TV camera;
  C. a TV monitor;
  D. synchronizing generator means coupled to said TV camera and monitor for providing necessary operating signals;
  E. circuit means for gating the same portion of the video output of said TV camera during each TV frame during said movement and for displaying said portions on said TV monitor in juxtaposed positions;
  F. said circuit means being operable to move said displayed portions on said TV monitor corresponding to movement of said TV camera relative to said target area;
  G. said gated video output being indicative of scene information from an area of reduced backscatter.

2. Apparatus according to claim 1 wherein:
  B. the portion of the video output gated during each TV frame is a function of camera angle, altitude and speed relative to said target area.
3. Apparatus according to claim 1 wherein:
  A. said means for illuminating is concentrated to provide illumination only in the general area of said reduced backscatter.
4. Apparatus according to claim 1 which includes:
  A. a carrier vehicle;
  B. said TV camera and said means for illuminating being mounted at spaced apart positions on said carrier vehicle.
5. Apparatus according to claim 1 wherein said circuit means includes:
  A. a storage means having a plurality of storage locations;
  B. said gated video output being placed into said storage locations.
6. Apparatus according to claim 5 wherein:
  A. said storage means is a rotating magnetic disk.
7. Apparatus according to claim 5 wherein:
  A. said TV camera and monitor are each operated in a 2:1 interlace mode and wherein;
  B. said circuit means is operable during each TV frame, to gate into said storage means, $n$ TV line signals of one field and $n$ TV line signals of the other field of said frame.
8. Apparatus according to claim 7 wherein:
  A. said synchronizing generator means includes a half-line counter and wherein;
  B. said circuit means is operable to prematurely reset said half-line counter on every other field.
9. Apparatus according to claim 8 wherein:
  A. said circuit means includes a counter coupled to said synchronizing generating means for counting indications of horizontal TV lines and for providing an output signal to reset said half-line counter after a predetermined number of said indications.
10. Apparatus according to claim 9 wherein:
  A. said counter starts its counting function at the beginning of vertical blanking and provides its output signal at a count equal to the number of TV lines normally in vertical blanking minus $n$.
11. A method of viewing a target area in a medium subject to backscatter, comprising the steps of:
  A. illuminating the target area;
  B. moving over the target area and viewing it with a TV camera;
  C. storing a predetermined portion of the TV output signal during each TV frame, and
  D. displaying the stored portions as a moving window display.

* * * * *